No. 695,271. Patented Mar. 11, 1902.
E. BESSE & L. LUBIN.
METHOD OF FILLING PRESERVE BOXES.
(Application filed Nov. 2, 1900.)
(No Model.)
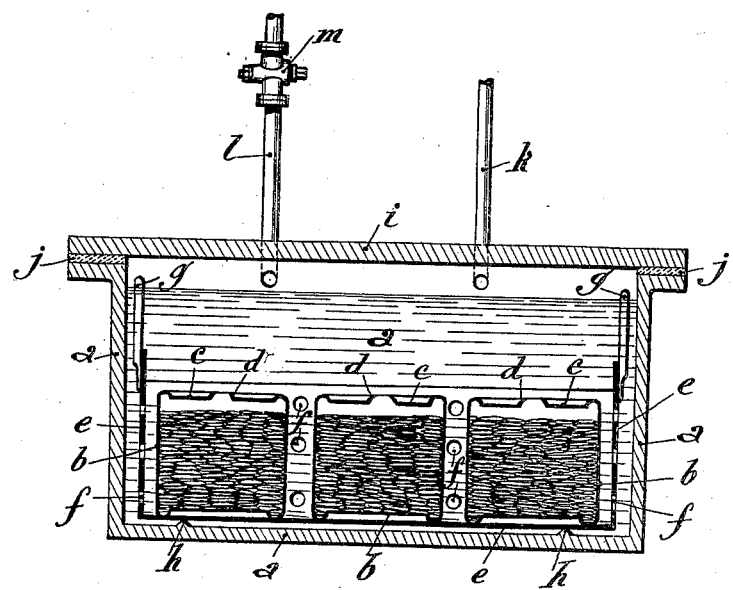
Witnesses:
C. E. Holske
Wm M. Avery
Inventors:
Emile Besse
Louis Lubin
BY
ATTORNEYS

UNITED STATES PATENT OFFICE.

EMILE BESSE AND LOUIS LUBIN, OF PARIS, FRANCE.

METHOD OF FILLING PRESERVE-BOXES.

SPECIFICATION forming part of Letters Patent No. 695,271, dated March 11, 1902.

Application filed November 2, 1900. Serial No. 35,255. (No specimens.)

*To all whom it may concern:*

Be it known that we, EMILE BESSE and LOUIS LUBIN, mechanical engineers, citizens of the Republic of France, residing at 97 Rue Saint Lazare, Paris, France, have invented a certain new and useful Improvement in the Method of Filling Preserve-Boxes, of which the following is a specification.

The method of filling and closing preserve-tins as heretofore generally employed consists in placing the foodstuffs into the boxes and then soldering the covers either by hand or mechanically. This method of operating when applied in connection with preserves in the composition of which (as is mostly the case) there is a more or less large percentage of liquid necessitates the employment of a considerable amount of heat in order to heat the walls of the box which are in contact with the liquid to a sufficiently-elevated temperature to enable them to be soldered. Moreover, this method gives rise to further difficulties during the soldering, owing to the heat disengaged by the application of the soldering-iron producing a certain amount of steam or vapor, forming pressure in the interior of the box, which tends to escape, and thus form blow-holes in the molten solder, so rendering the operation difficult. This circumstance renders it necessary to provide a small hole for the escape of the steam during soldering, said hole being afterward closed in suitable manner. The various inconveniences are obviated by employing the method according to this invention, whereby the liquid portion of the preserves is introduced into the box only after its closure by soldering.

This improved method comprises the following operations: The tins ready for filling—that is to say, minus their cover—are filled with the foodstuff (vegetables, fish, meat, or the like) forming the solid part of the preserve, or if the preserve is a liquid—such as milk, for example—they are left entirely empty. In both cases the cover, previously pierced with a small hole, (for the purpose already explained,) is soldered to the tin in the usual manner, but with greater facility and security as regards the operation and the tightness of the joint. The tins thus prepared and the interior of which can now no longer communicate with the ambient air except through the small hole in the cover are now placed in series in an apparatus, of which a suitable form is shown by way of an example in the accompanying drawing, which represents a longitudinal section of the apparatus in which the tins are filled with liquid or juice or the like by the action of a vacuo. This apparatus consists of a trough $a$, having its walls of sufficient strength to withstand the atmospheric pressure, and into which the liquid is introduced to a convenient level—*i. e.*, as high as possible without risking its ultimate escape over the border. A certain number of tins $b\ b\ b$ for filling and prepared in the manner hereinbefore stated with their covers $c\ c\ c$ pierced with holes $d\ d\ d$ are placed in a crate or basket $e$ of perforated sheet-iron with holes $f\ f\ f$ or of wire-netting or of any other appropriate material and construction, so as to allow the liquid to readily enter the interior of the crate or basket when being placed in the trough $a$, in which latter it is placed by holding it by its handles $g\ g$ until it reaches the bottom, as shown in Fig. 1, where it reposes upon ribs $h$ or the like. In case the tins $b$, although charged with the solid portion of the foodstuff, are not sufficiently heavy to sink to the bottom or if they are entirely empty, so as to contain only liquid, it is advantageous to prevent these tins from floating to the surface by securing them in the crate $e$ either by a perforated cover or by weighting them or by any other convenient means. After the crate or basket $e$, with its number of tins $b$, has been duly placed on the bottom of the trough $a$, with a head of liquid at least equal or preferably superior to that to be introduced into the tins, the trough $a$ is closed by means of a lid $i$ of sufficient strength to support the atmospheric pressure, while a tight joint is obtained by placing a packing $j$ of rubber or other suitable material upon the flanged top edges of the trough $a$. At the uppermost edge of this latter there are provided two tubes $k$ and $l$, as shown in the drawing. The tube $k$ is in communication with an air-pump or other appropriate apparatus for creating a vacuum. The tube $l$, furnished with a cock $m$, opens into the atmosphere. When the lid $i$ has been closed down upon the trough $a$, the cock $m$ is closed and the vacuum-pump is then started, thereby causing the lid to be firmly pressed upon the packing $j$ and form a tight joint with the trough $a$. At the same time the air confined in the upper portion of the trough is gradually rarefied, and this is also the same with the air in the interior of the tins $b$, from which it escapes through the holes $d$ in the covers. When a vacuo-indicator connected with the pipe $k$ shows that practically all the air has been exhausted from the apparatus, the pump is stopped and the cock $m$ is opened. Hereupon the atmospheric pressure acting upon the surface of the liquid forces this latter quickly through the holes $d$ into the interior of the tins $b$, which are thus filled in a few moments and all the more complete the greater the vacuum in the trough. After equilibrium of pressure has been reëstablished it is easy to raise the lid $i$ and to remove the crate or basket $e$ with the tins $b$ and to replace it by a fresh one to be subjected to the same operation after previously replenishing the liquid in the trough $a$ to its former level.

It is only necessary to close the small hole in the top of the tin by a drop of solder or by the application of a small disk closing the hole $d$ in the cover $c$ or in any other manner.

The apparatus hereinbefore described may evidently be constructed in any form, size, proportions, and material most suitable to the particular nature of the preserves and also with regard to the form and number of the tins or boxes containing the preserves and which it is desired to treat simultaneously. We therefore do not wish to limit ourselves strictly to the exact details of the apparatus herein described by way of an example, and

We claim—

1. A method for filling preserve boxes or tins or analogous receptacles with the liquid after having been filled with the solid portion of the preserves and soldered, which method consists in then immersing the boxes or tins so prepared and each having a small hole in its cover in a trough capable of being hermetically closed and containing the liquid to be filled in the boxes, then forming a vacuo as complete as possible in the said trough, and afterward allowing atmospheric air to enter said trough and press on the surface of the liquid so as to compel the liquid to penetrate into the boxes or tins to replace the air exhausted therefrom by the action of the vacuo.

2. A method of filling receptacles with a liquid, which consists in placing the said receptacles in a trough containing the liquid with which they are to be filled and beneath the surface of the liquid, the trough being capable of being closed after the cans have been placed therein, rarefying the air in the said trough to produce a partial vacuum in the receptacles, and then allowing air to enter the trough and press on the surface of the liquid to force the liquid into the receptacles.

In testimony whereof we have hereunto signed our names in the presence of two subscribing witnesses.

EMILE BESSE.
LOUIS LUBIN.

Witnesses:
  GEORGES DELOU,
  EDWARD P. MACLEAN.